United States Patent
Bacher et al.

(10) Patent No.: US 6,406,174 B2
(45) Date of Patent: *Jun. 18, 2002

(54) PROCESS AND DEVICE FOR MONITORING THE DEGREE OF WEAR OF A COMPRESSION WORM CONVEYING PLASTICIZED MATERIAL

(76) Inventors: Helmut Bacher, Bruck/Hausleiten 17; Helmuth Schulz, Badstrasse 20, both of St. Florian (AT), A-4490; Georg Wendelin, Waldbothenweg 84, Linz (AT), A-4033

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,140
(22) PCT Filed: Apr. 20, 1998
(86) PCT No.: PCT/AT98/00102
§ 371 (c)(1),
(2), (4) Date: Sep. 29, 1999
(87) PCT Pub. No.: WO98/47687
PCT Pub. Date: Oct. 29, 1998

(30) Foreign Application Priority Data

Apr. 23, 1997 (AT) .................................................. 693/97

(51) Int. Cl.[7] .............................. B29B 7/42; B29B 7/72
(52) U.S. Cl. ............................. 366/82; 366/88; 366/142
(58) Field of Search .............................. 366/75, 79, 81, 366/82, 88–90, 142; 425/203, 204, 208, 209

(56) References Cited

U.S. PATENT DOCUMENTS 3,193,877 A * 7/1965 Edwards
3,360,824 A * 1/1968 Schippers (List continued on next page.)

FOREIGN PATENT DOCUMENTS

| GB | 927501 | * 5/1963 | .................. 366/82 |
| WO | 93/04841 | * 3/1993 | |
| WO | 94/29097 | * 12/1994 | |

OTHER PUBLICATIONS

Patent Abstracts of Japan, vol. 018, No. 115 & Japan 05309721, Feb. 1994.*
Patent Abstracts of Japan, vol. 018, No. 272 & Japan 06047797, May 1994.*
Patent Abstracts of Japan, vol. 012, No. 386 & Japan 63139705, Feb. 1994.*

* cited by examiner

Primary Examiner—Charles E. Cooley
(74) Attorney, Agent, or Firm—Salter & Michaelson

(57) ABSTRACT

An apparatus and a method for controlling a degree of attrition or wear of a sealing screw conveying plasticized material are provided. The apparatus includes an opening which intersects the wall of a housing of the screw in the region of the screw threads or in the region immediately neighboring the screw threads. Another opening intersects the wall of the housing. The two openings are spaced apart axially from each other and the pressure sensors connected to both openings. The process involved conveys a plasticized material against a resistance, the resistance being a sealing screw bearing supported within the screw housing. The pressure of the conveyed material is measured at two locations spaced apart from each other in the direction of conveyance. The two locations are disposed on both sides of a resistance body towards which the sealing screw conveys the material. The difference between the two measured values is used to indicate the degree of wear of the screw or its housing, respectively.

11 Claims, 3 Drawing Sheets

U.S. PATENT DOCUMENTS

| | | | |
|---|---|---|---|
| 3,700,247 A | * 10/1972 | Butler et al. | |
| 4,708,616 A | * 11/1987 | Humer | |
| 4,730,935 A | * 3/1988 | Kolossow | 366/82 |
| 4,902,455 A | * 2/1990 | Wobbe | 366/75 |
| 5,017,015 A | * 5/1991 | Schlumpf et al. | 366/82 |
| 5,130,070 A | * 7/1992 | Martin | 366/88 |
| 5,419,634 A | * 5/1995 | Bacher et al. | 366/88 |
| 5,490,725 A | * 2/1996 | Behrens et al. | 366/82 |
| 5,630,968 A | * 5/1997 | Wang et al. | 425/208 |
| 5,651,944 A | * 7/1997 | Schulz et al. | 366/88 |

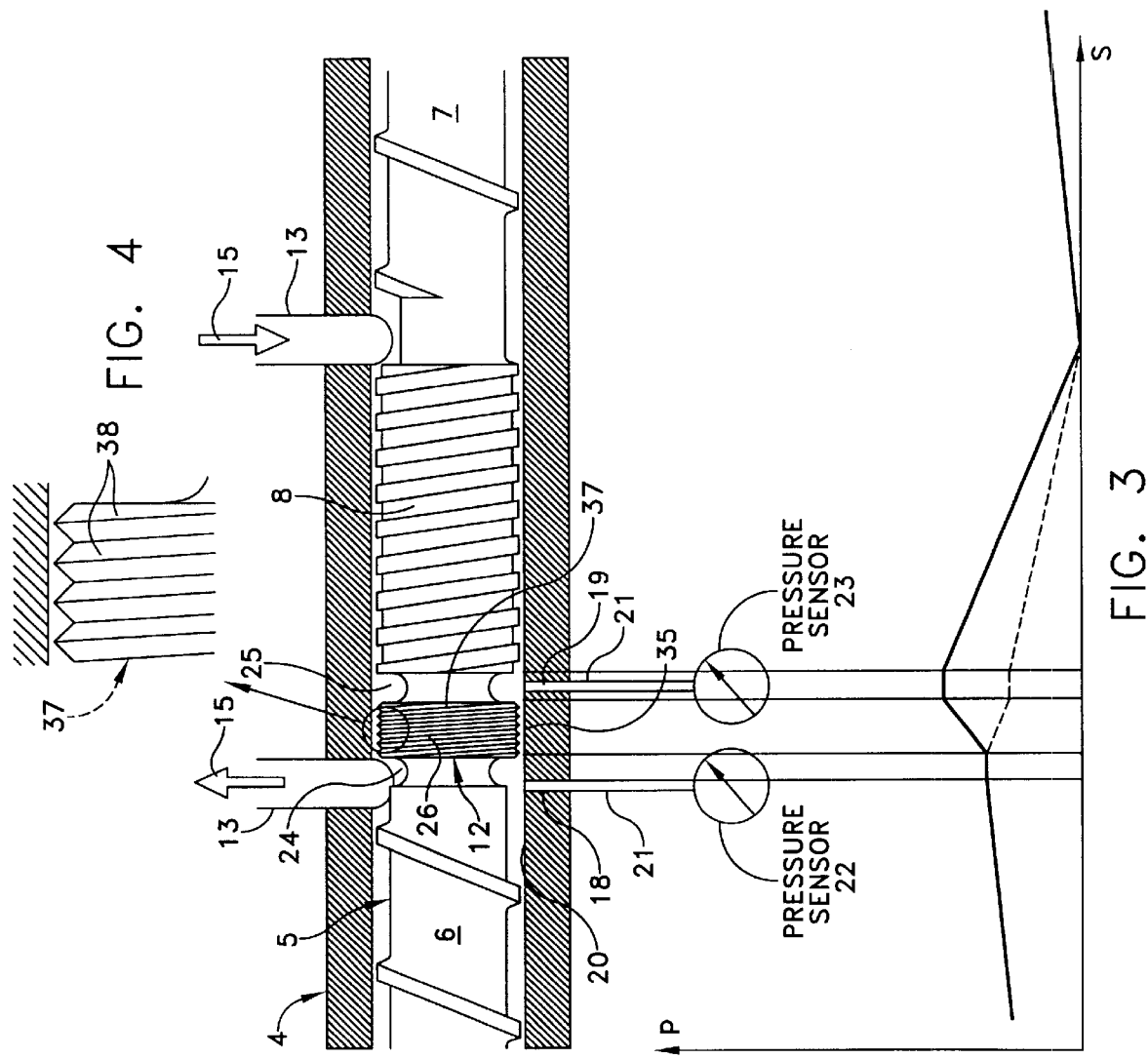

PROCESS AND DEVICE FOR MONITORING THE DEGREE OF WEAR OF A COMPRESSION WORM CONVEYING PLASTICIZED MATERIAL

TECHNICAL FIELD

The invention relates to a process for controlling the degree of attrition of a sealing screw conveying a plasticized material, in particular synthetic plastic material, against a resistance body, which screw is bearingly supported within a screw housing between two screw sections located axially spaced apart from each other, the pitch of the threads of the sealing screw being directed opposite to that of the two screw sections, wherein the housings of the two screw sections are interconnected by a connecting channel leading the material conveyed by the two screw sections, a station for processing the material flowing within the connection channel, in particular a filter station, being connected to the connection channel, and wherein the resistance body is disposed between the sealing screw and that place at which the connection channel branches off the housing of that screw section through which the material flows at first. Further, the invention relates to an apparatus for performing such a process.

BACKGROUND OF RELATED ART AND SUMMARY OF THE INVENTION

All screws bearingly supported within a screw housing and - although to a less degree - their housings are subject to wear, even when provided with best armoring, in particular screws conveying a material, containing abrasive components, for instance more or less soiled, mainly thermoplastic, synthetic plastic material of the recycling industry. With screws conveying against an extruder head, wear leads to the disadvantage that the pressure in front of the extruder head required for a perfect extrusion of the material cannot more reliably built up since the material slides back in an uncontrollable manner through the periphery gaps between screw and housing, which gaps occur due to the wear. Particularly undesirable is the wear with sealing screws which in the initially described manner are interposed between screw sections. Within this, the sealing screw is bridged by the connection channel forming a by-pass of the sealing screw. A wear in the region of the sealing screw, what occurs overtime, can be observed by gradual soiling of the material supplied to further processing, in particular to an extruder head, so that also the final product, as a rule a granulate obtained at the extruder head, is soiled. This causes complaints of the firms processing the final granulate. Soiled granulate has a less value and, in addition thereto, the granulate production of weeks must possibly be subjected to a second thermic filter processing, this; however, has the disadvantage that the second heat treatment requires unnecessary power consumption and that the molecular chains of the synthetic plastic material are adversely affected.

In order to avoid these difficulties, the sealing screw must be dismounted in regular time intervals and the housing as well as the screw must be checked in view of wear or attrition. However, this work - as experience shows - is hardly ever made, because it is time consuming and must be done by experienced people, because the wear in the region of the sealing screw can occur on this screw itself and this not only in view of the outer diameter of the screw threads, but also in view of the core diameter of the sealing screw, as well as on the cylindrical screw housing.

The invention has at its object to provide a process by which the control of the degree of wear of a sealing screw is possible without any problem, so that it can be seen at any time to what degree the wear of the screw or also its housing has been increased, and this also during operation. The invention solves this task by the features that the pressure of the material conveyed by the screw section that is at first passed by the material and the pressure of the material conveyed by the sealing screw are measured, in front of the resistance body, respectively, and that the difference of the two pressures is used for indicating the degree of attrition. In this connection, the invention starts from the perception that the pressure onto the material conveyed by the screw in direction of conveyance of the screw, therefore towards the resistance body, always increases as long as the screw works unobjectionably. If, therefore, the pressure at that place of measurement which is reached by the conveyed material at first, is designated by $P_1$ and the measured pressure at the other place is designated by $P_2$, then the function of the screw is unobjectionable if $P_2$ is greater than $p_1$. If both pressures $P_1$ and $P_2$ equalize, this so to be understood that the attrition has already been much increased, what, as a rule, means already a critical limit. If $P_2$ becomes smaller than $P_1$, then the function of the screw is no longer sufficient. When normally operating, namely, the perfect sealing screw conveys always a small portion of the material supplied via the connection channel to the second screw section back in direction towards the first screw section. If the function of the sealing screw is unobjectionable, the pressure of the material at that place of measurement which is located nearer to the sealing screw, is always greater than the pressure of the material at the other place of measurement. If both pressures become equal, this means that the sealing screw works neutrally, that is, no synthetic plastic material melt is conveyed by the sealing screw towards the first screw section. If the melt pressure at the place of measurement neighboring the sealing screw is smaller than at the other place of measurement, this means that, for example, the sealing section formed by the sealing screw is passed by unfiltered melt in direction towards the extruder head or towards an other outlet opening. The sealing function of the sealing screw, therefore, is then no more given to a sufficient degree and unfinished, in particular unfiltered, portions of the material will occur in the final product because the sealing screw then forms an undesired by-pass for the connection channel leading to the treatment station of the conveyed material, in particular to the filter.

"Screw threads"in this connection are to be understood by the volutions of the screw.

For comparison measurements of synthetic plastics material it is known to measure the pressure of the material at two places spaced apart from each other in a tube section which follows a screw section and has a reduced diameter. Since the diameter of this tube section is constant, the pressure at the location which is at first reached by the synthetic plastic material, is greater than at the other location, caused by the wall friction of the plastic material at the inner wall of the tube section. Further, no one of the two measurements is made within the region of the screw threads or the screw housing, and the measuring results obtained are only used for determining the properties of the synthetic plastic material and not for controlling the degree of wear of a screw.

The inventive apparatus for performing the process is characterized by the fact that two screw sections axially spaced apart from each other are interconnected for common rotation by a sealing screw, that an opening intersects the wall of the housing of the screw section that is at first passed by the material in the region of its screw threads or in an area immediately neighboring thereto, and a further opening intersects the wall of this housing or of the housing of the sealing screw, the two openings being spaced apart from each other, measured in axial direction of the screw sections, wherein the resistance body is disposed in the region of this spacing, and that to each one of the two openings a pressure sensor is connected. The indications of these pressure sensors are already sufficient for controlling the degree of wear of the screw or its housing in the above explained manner. However, it is more favorable, if transducers are connected to the pressure sensors, which at their output deliver an electrical signal to a comparison circuit, to the output of which an indication instrument is connected. This comparison circuit controls continuously the pressure difference of $P_1$ and $P_2$ and indicates it by means of the indication instrument. This instrument, in a manner known per se, can be so constructed that it produces a warning signal as soon as the pressure difference decreases a predetermined value. This warning signal may be of acoustic or visual kind and, if desired, may be immediately used for stopping the plant.

It is particularly favorable, if according to a further embodiment, at least one of the two openings in the wall of the screw housing branches off an annular channel neighboring the screw threads of the screw section or of the sealing screw. This has the disadvantage that the measuring result or the pressure sensor connected to the respective opening is free of impulses.

According to a further embodiment, the resistance body may be formed by a baffle body which is disposed between the two openings and dams up the supplied material and is disposed on a shaft connecting the screw sections with the sealing screw. This results in a simple construction inasmuch this baffle body may have a plurality of constructions. The simplest embodiment consists in that the baffle body is a disk which confines a narrow annular gap between its periphery and the wall of the housing of the sealing screw; a further embodiment of this construction may consist in that at least one annular groove is provided on the periphery of the disk. This annular groove causes turbulences in the plasticized material passing the disk, what increases the resistance for this material. Alternatively, baffle body may be a screw thread section, the screw threads of which have the same conveyance direction as the screw threads of the sealing screws, but are finer. These fine screw threads cannot convey the entire material supplied by the comparatively coarser screw threads of the sealing screw. The difference in the amount of the material conveyed by the sealing screw, therefore, is "shifted" over the fine screw threads, that means that it is pressed pass the fine screw threads, what causes an increase of pressure at the end of the sealing screw.

BRIEF DESCRIPTION OF THE DRAWINGS

The subject matter of the invention is schematically shown in the drawings by way of exemplary embodiments.

FIG. 3 shows a further embodiment, also with the respective material pressure course.

FIG. 4 shows a detail of FIG. 3 in an enlarged scale.

DETAILED DESCRIPTION OF THE ILLUSTRATIVE EMBODIMENT

Figure 1:
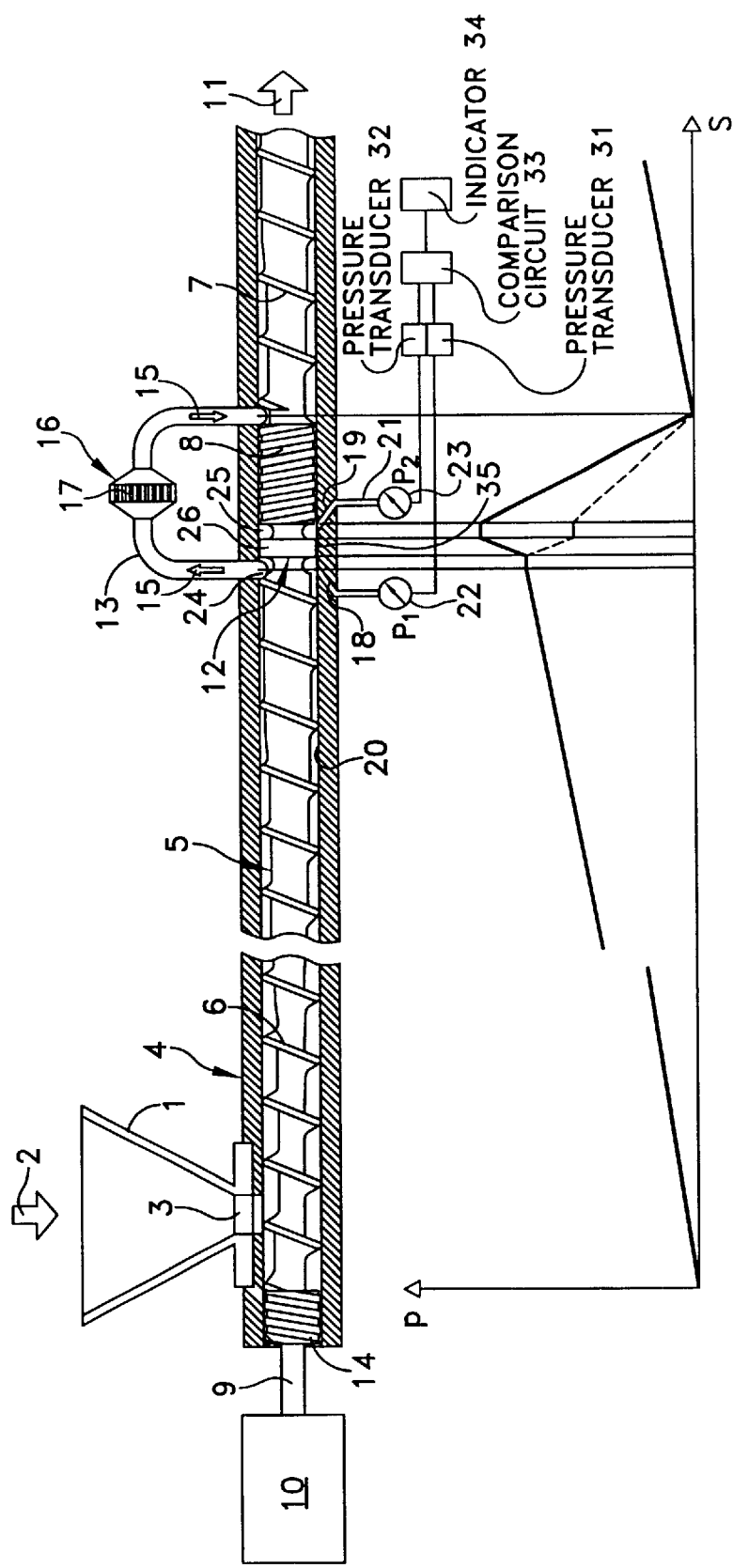
FIG. 1 shows a longitudinal section through a first embodiment having an apparatus provided with a sealing screw, and the course of the material pressure within this apparatus is shown by a graphical representation.

Within the apparatus according to FIG. 1, the material to be processed, in particular soiled thermoplastic synthetic plastics material, obtained from waste products, if desired after a pre-comminuting process, is filled into a hopper 1 in direction of the arrow 2 and thus reaches through an intake opening 3 the interior of a screw housing 4 in which a screw 5 is bearingly supported. This screw 5 has two sections 6, 7 axially spaced apart from each other, between which a sealing screw 8 is disposed, the pitch of the screw threads thereof being oppositely directed to the pitch of the screw threads of the two sections 6, 7. The two screw sections 6, 7 and the sealing screw 8 are disposed on a common shaft 9 that is so rotated by a motor 10 that the material introduced through the intake opening 3 is conveyed by the two screw sections 6, 7 in direction of the arrow 11, for example towards an extruder head. Suitably, the two screw sections 6, 7 and the sealing screw 8 have equal outer diameter of the screw threads, what has the advantage that the housing 4 bearingly supporting all of these screws can have a continuously constant inner diameter. At the intake end of the screw 5, sealing screw threads 14 are provided which have a reduced pitch and a reduced lead, when compared with the screw sections 6, 7.

For by-passing the sealing screw 8, a connection channel 13 is provided which intersects the housing sections associated to the screw sections 6 and 7 at both sides of the sealing screw 8 and in which the material conveyed by the screw sections 6, 7 flows in direction of the arrows 15. A station 16 for processing the material flowing in the connection channel 13. This material processing may be of different kind, for example an addition of filling materials, colouring matter or other additions. In the most cases, if desired in addition to the above described possibilities, the station 16 is a filter station 17, the filters thereof filtering the impurities, in particular solid bodies of all kind, out of the plasticized synthetic plastic material, so that cleaned synthetic plastic material from the connection channel 13 enters the section of the housing 4 surrounding the screw section 7 and is conveyed by the screw section 7 towards the exit, in particular towards an extruder head. As it can be seen, the clearness of the material conveyed by the screw section 7 towards the extruder head, depends from the sealing function of the sealing screw 8. If this sealing function is insufficient, for example due to wear of the sealing screw 8 and/or of its housing, no unobjectionable sealing between the two screw sections 6, 7 is given more, so that soiled material conveyed by the screw section 6 reaches the screw section 7 without having passed the connection channel 13 and the filter inserted into it. This means, that unfiltered, therefore soiled, material is conveyed by the screw section 7 towards the extruder head or towards the other outlet and ultimately can be noticed by a pollution of the produced final product, as a rule granulate. If the station 16 is not or not exclusively a filter station 17, but for example adds additives, then the desired mixing ratio of the material supplied to the extruder head or the like cannot be reliably kept more, but depends from the sealing function of the sealing screw 8.

In order to continuously control the sealing function of the sealing screw 8, two openings 18, 19 are provided which intersect the wall 20 of the screw housing 4 and are disposed spaced apart from each other, when seen in axial direction of the housing 4. The one opening 18 is located in the region of the end of the screw threads of the screw section 6 or immediately neighbouring this end, the other opening 19 is displaced with respect to the opening 18 in direction of the arrow 11 and is located in a region of the housing 4 adjacent to the screw threads of the screw section 6, however still in front of the sealing screw 8, when seen in direction of the arrow 11. To each one of the two openings 18, 19 a pressure sensor 22 or 23, respectively, is connected by means of pressure lines 21. By means of these two pressure sensors 22, 23, therefore, the pressure of the material conveyed by the apparatus can be measured at the respective location. Between the two openings 18, 19 there is disposed a resistance body 12 put onto the shaft 9, which body within this embodiment is formed by a disk-shaped baffle body 26, between the periphery thereof and the inner wall of the housing section surrounding the resistance body 12, there being a narrow annular gap 35 through which the material conveyed by the sealing section 8 can enter the housing section of the screw section 6. This damming body 26 has no threads and acts so that it builts up an increased resistance for the material conveyed by the sealing screw 8, which resistance must be overcome by the sealing screw 8.

Therefore, a perfect sealing screw in normal operation conveys always a small portion of the filtered material back (against direction of the arrow 11) into the housing of the screw section 6. The resistance body 12 causes that the material pressure $P_2$ sensed by the pressure sensor 23 is always greater than the material pressure $P_1$ sensed by the pressure sensor 22, if the sealing screw 8 has a perfect function. The difference value $P_2-P_1$ therefore, is a value from which conclusions can be drawn for the sealing condition of the sealing screw 8. If the two pressures $P_2$ and $P_1$ become equal, this means that the sealing screw works neutrally, that means, no synthetic plastic melt is conveyed by the sealing screw 8 against the direction of the arrow 11. If $P_2$ becomes smaller than $P_1$ this means that the sealing section formed by the sealing screw 8 is passed in extrusion direction (arrow 11) by unfiltered synthetic plastic melt. Then, the sealing function is no more ensured and the final product is soiled in an undesirable manner.

FIG. 1 shows also the course of pressure p in dependence from the length of path s measured in axial direction of the screw 5 in form of a diagram. By full lines, the pressure course for an ideal condition of the sealing screw is shown, by broken lines a condition is shown at which the sealing screw is "passed" by unfiltered, plasticized synthetic plastic material in direction of the arrow 11. It can be seen that for a perfect sealing screw the conveyance action of the sealing screw 8 against the resistance body 12 produces a pressure value at the upstream-side end of the sealing screw 8, therefore at the opening 19, which pressure is greater than the pressure at all other locations of the plant, in particular at those locations of the apparatus, which are located in front of the opening 19, when seen in direction of the arrow 11. If, however, the sealing screw 8 or the housing section surrounding it shows unduly great attrition or wear, the pressure at the opening 19 decreases so, that this pressure is no more greater than the pressure at the opening 18, but smaller.

Suitably, an annular channel 24 or 25, respectively, each, is disposed in the region of the two openings 18, 19, which channels are free from screw threads, in order to make the measuring results of the two pressure sensors 22, 23 independent from pulsations introduced via the screw threads.

Transducers 31, 32 (FIG. 1) may be connected to both pressure sensors 22, 23, which transducers transform the pressure values measured by the pressure sensors 22, 23 into electrical values. The output of the two transducers 31, 32 is connected to a comparison circuit 33, which in a manner known per se compares the electrical signals delivered by the transducers 31, 32 and indicates the difference of the two signal values at an indication device 34 in an optical and/or acoustical manner. The signal obtained by the comparison circuit 33 may also be used for automatically stopping the apparatus if a degree of attrition is noticed which exceeds a predetermined value.

Figure 2:
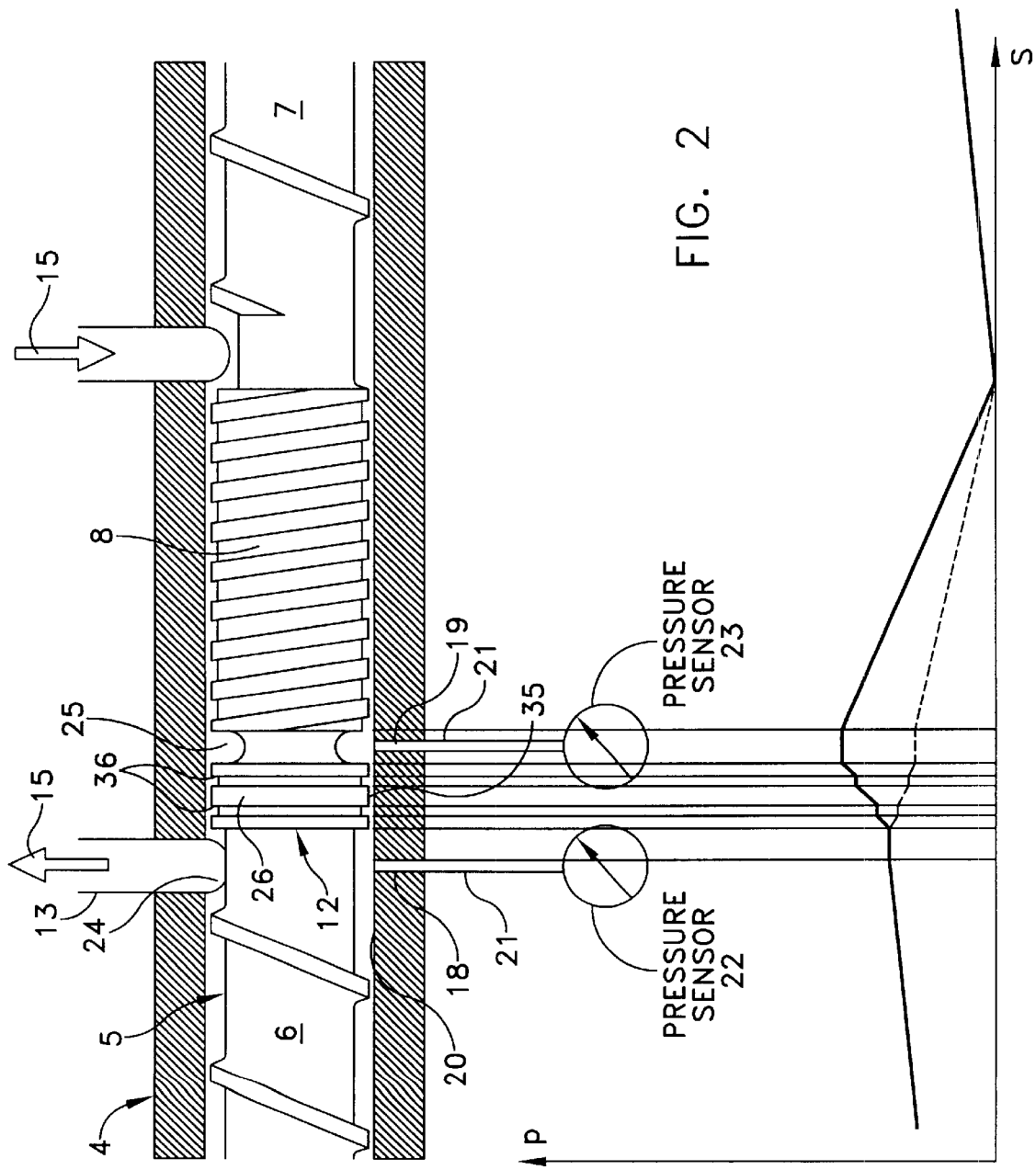
FIG. 2 shows a first variant of this embodiment, also with a corresponding graphical representation of the material pressure course

The embodiment according to FIG. 2 differs from that according to FIG. 1 only in that two annular grooves 36 are provided on the periphery of the resistance body 12 formed by a disk-shaped baffle body 26, which grooves introduce turbulences into the material flowing within the gap 35 so that the resistance for the flow within the gap 35 is increased. Besides of this, the apparatus according to FIG. 2 corresponds to that according to FIG. 1, the members connected to the two pressure sensors 22, 23 being not shown in FIG. 2 for simplification's sake, and also not the station 16.

Also FIG. 2 shows the course of pressure in the apparatus by way of a diagram, and again there indicates a full line the pressure course for a perfect sealing screw 8, whereas the interrupted lines indicate the conditions for an imperfect function of the sealing screw 8.

The embodiment according to FIGS. 3 and 4 differs from those according to FIGS. 1 and 2 in that the baffle body 26 on its periphery is provided with fine threads 37. These fine threads 37 indeed have the same pitch direction as the threads or the volutions of the sealing screw 8, however, the fine threads are much finer than the latter threads. The fine threads 37, therefore, cannot convey the entire material supplied by the sealing screw 8 against the direction of the arrow 11 in direction towards the screw thread 6. A portion of this material, therefore, is conveyed through the annular gap 35 along the volutions 38 (FIG. 4) of the fine threads 37 towards the left (FIG. 3), so that—for example the fine threads 37 are "passed". Thereby a resistance for the material conveyed by the sealing screw 8 is created, so that—if the sealing screw 8 works perfectly—there is the pressure course shown in the diagram by full lines, and this pressure course changes to that shown by interrupted lines if the sealing screw 8 and/or its housing section show a higher wear.

What is claimed is:

1. A process for controlling the degree of attrition of a sealing screw conveying a plasticized material against a resistance body, which sealing screw is bearingly supported within a screw housing between a first screw section and a second screw section disposed axially spaced apart from each other, the pitch of the threads of the sealing screw being directed opposite to the pitch of the first and second screw sections wherein a first housing section of the first screw section and a second housing section of the second screw section are interconnected by a connection channel leading the material conveyed by the first and second screw sections, a station for processing the material flowing within this connection channel being connected to the connection channel, and wherein the resistance body is disposed between the sealing screw and that place at which the connection channel branches off the first housing section of the first screw section through which the material flows at first, wherein the pressure of the material conveyed by the first screw section and the pressure of the material conveyed by the sealing screw are measured in front of the resistance body and whereby the difference of the two pressures is used for indicating the degree of attrition.

2. An apparatus for controlling the degree of attrition of a sealing screw conveying a plasticized material, comprising:

a screw housing having a wall;

a sealing screw disposed within the screw housing;

an upstream screw section having an upstream end and a downstream end and disposed within an upstream housing section of the screw housing, a downstream screw section disposed within a downstream section of the screw housing, the upstream screw section and the downstream screw section being axially spaced apart and interconnected for common rotation by the sealing screw;

a connecting channel bypassing the sealing screw, the connecting channel including a first opening intersecting the housing wall of the upstream housing section proximate the downstream end of the upstream screw section and a second opening intersecting the housing wall proximate the sealing screw; and a station for processing the material flowing within the connection channel fluidly connected to the connection channel;

wherein the first and the second openings are axially spaced apart, and further including a resistance body disposed between the upstream screw section and the scaling screw, a third opening intersecting the housing wall of the upstream housing section near the downstream end thereof, a fourth opening intersecting the housing wall of the screw housing of the sealing screw in front of its end facing the upstream screw section, a first pressure sensor connected to third opening, and a second pressure sensor connected to the fourth opening.

3. The apparatus of claim 2, wherein transducers are connected to the pressure sensors, which transducers at their outputs deliver electrical signals to a comparison circuit, to the output of which an indication device is connected.

4. The apparatus of claim 2, wherein at least one of the first and third openings in the housing wall branches off an annular channel neighboring the screw threads of the upstream screw section.

5. The apparatus of claim 2, wherein at least one of the first and third openings in the housing wall branches off an annular channel neighboring the screw threads of the sealing screw.

6. The apparatus of claim 2, wherein the resistance body is formed by a baffle body, said baffle body being provided on a shaft connecting the screw sections with the sealing screw.

7. The apparatus of claim 6, wherein the baffle body is a disk, a narrow annular gap being provided between the periphery of the disk and the wall of the housing section surrounding the sealing screw.

8. The apparatus of claim 7, wherein at least one annular groove is provided on the periphery of the disk.

9. The apparatus of claim 6, wherein the baffle body includes a screw thread section having screw threads finer than the screw threads of the sealing screw, and the screw threads of the screw thread section having the same conveyance direction as the screw threads of the sealing screw.

10. The apparatus of claim 2, wherein the two screw sections have the same outer diameter as the diameter of the sealing screw threads.

11. The apparatus of claim 2, wherein the sealing screw has an outer diameter of its screw threads which is equal to the outer diameter of the screw threads of at least one of the two screw sections.

* * * * *